UNITED STATES PATENT OFFICE.

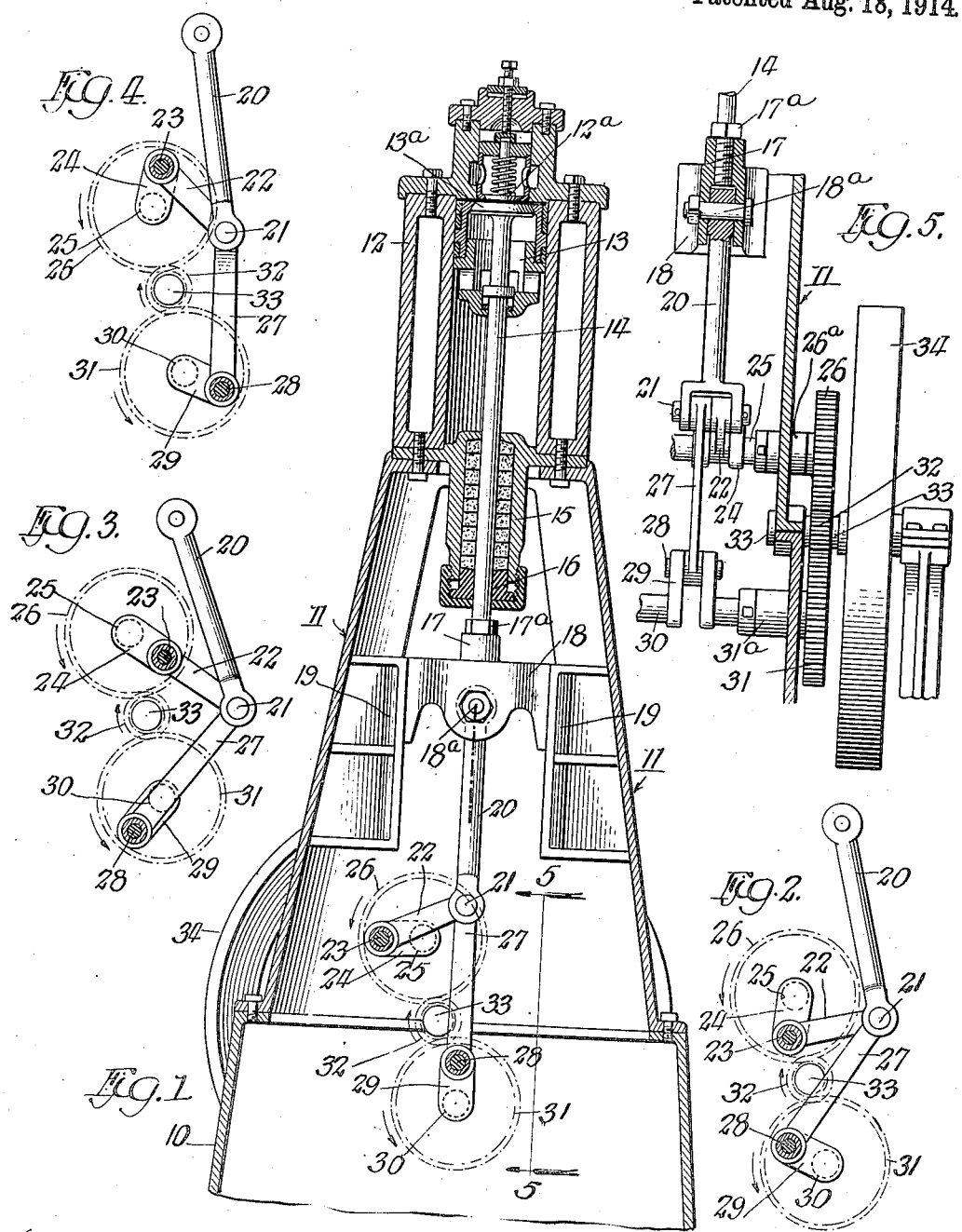

JOHN C. KITTON, OF CHICAGO, ILLINOIS.

MECHANICAL MOVEMENT.

1,107,529.

Specification of Letters Patent. Patented Aug. 18, 1914.

Application filed May 20, 1912. Serial No. 698,380.

*To all whom it may concern:*

Be it known that I, JOHN C. KITTON, a citizen of the United States, and a resident of Chicago, in the county of Cook and State of Illinois, have invented certain new and useful Improvements in Mechanical Movements; and I do hereby declare that the following is a full, clear, and exact description thereof, reference being had to the accompanying drawings, and to the letters of reference marked thereon, which form a part of this specification.

This invention relates to an improved mechanical movement in the nature of a crank and link motion and more particularly to an improvement in that class of mechanical movements in the nature of a crank and link motion adapted to transform a rotary motion into a reciprocatory motion or a reciprocatory motion into a rotary motion.

It is the object of this invention to provide a device of the nature above stated, whereby the rotative member, which may be either a driving or driven member, has a uniform velocity or speed of rotation, while the reciprocatory member, which also may be either a driving or a driven member, has, during a portion of each of its strokes, a more nearly uniform rate of speed than is the case when an ordinary crank is employed, while the rate of speed during its stroke in one direction is different from, or faster or slower, than its rate of speed during its stroke in the opposite direction.

The invention is shown in the accompanying drawings as applied in connection with an ordinary type of air compressor but it is also to be understood that the invention may be applied in connection with the ordinary type of internal combustion engine. Its application to the air compressor is an example of its application to a machine in which the rotary member is the driving member and the reciprocating member is the driven member. Conversely its application to the internal combustion engine illustrates a case in which the reciprocating member is the driving member and the rotary member is the driven member. It is not desired, however, to limit the application of my mechanical movement to the types of machines referred to, but the same may be employed in connection with any form of mechanical device, apparatus or machine to which it may be applicable.

The invention consists in the matters hereinafter described and more particularly pointed out in the appended claims.

In the drawings—Figure 1 is a vertical cross-sectional view of an air compressor constructed in accordance with my invention, with parts shown in side elevation; Figs. 2 to 4, inclusive, are detail views in side elevation of the crank and link members, in various positions; Fig. 5 is a cross-sectional view in detail taken on the line 5—5 of Fig. 1, and showing the crank and link members, gear members, driving pulley and outer bearing in elevation.

Referring to the drawings, I have therein shown a portion 10 of the base of an air compressor, upon which is mounted the frame 11. Rigidly mounted upon said frame 11 is a vertically arranged pump cylinder 12, containing a piston 13 adapted to slide or reciprocate within said cylinder. The cylinder is provided at its upper end with an outwardly opening, spring actuated valve $12^a$, and the piston with an inwardly opening valve $13^a$. The said valve $13^a$ corresponds in construction with that shown in my prior application for patent Serial No. 680,093, filed February 26, 1912. The piston 13 is attached to the upper end of a piston rod 14, which extends vertically downward through a stuffing box 15 and gland 16, and is attached by means of a threaded connection 17 and lock nut $17^a$ to a crosshead 18 adapted to slide upward and downward in contact with the vertically arranged guides 19, 19. Said guides are rigidly attached to and extend inwardly from the interior walls of the frame 11. A connecting rod 20 is pivoted to the crosshead 18 by means of a bolt $18^a$. The lower extremity of the said connecting rod 20 is provided with a pivot pin 21 whereby the ends of two links 22 and 27 are pivotally attached to said connecting rod. The link 22 is connected at its opposite end with a crank pin 23 and thereby attached to a crank 24, and, in a similar manner, the link 27 is connected at its opposite end with a crank pin 28 and thereby attached to the crank 29. The crank 24 is upon and in fixed relation to and, by preference, integral with a crank shaft 25, the same being supported by a bearing $26^a$— see Fig. 5—in the wall of the frame 11. This shaft 25 is provided at its outer end with a gear wheel 26 rigidly attached thereto and located, by preference, on the outside of the frame 11. In like manner the crank 29 is fixed to or integral with a crank shaft 30—see Figs. 1 and 5—supported by a bearing 31ᵃ and provided with a gear wheel 31 similar to the gear wheel 26 in fixed relation to and rotatable with said shaft 30. Between and in toothed engagement with the gear wheels 26 and 31 is a pinion 32, and the gear wheels 26 and 31 are preferably larger in diameter than said pinion. Said pinion is mounted upon and in fixed relation to a driving shaft 33, together with a driving pulley or flywheel 34. The wheel 34 may be of any desired form adapted to enable power for operating the parts to be applied by means of a belt, link chain or other suitable medium of power transmission.

In the operation of an air compressor made as described, power is applied to the driving pulley or wheel 34, which gives a rotary motion to the driving shaft 33 and to the pinion 32 rigidly attached thereto. The said pinion drives or rotates the gear wheels 29 and 31 both in the same direction but in a direction opposite to the direction of rotation of the pinion, and the cranks 24 and 29 are correspondingly rotated in the same direction with the gear wheels 29 and 31. By the action of the said cranks, the links 22 and 27, and the connecting-rod 20, a reciprocatory motion is given to the rod 20 and crosshead 18, which, in turn, through the medium of the piston rod 14, transmits such reciprocatory motion to the piston 13. The operations of the piston in the cylinder during one complete cycle, are as follows: Assuming the piston to be in the position shown in Fig. 1, and about to begin its downward stroke, and a charge of the fluid having been drawn into the cylinder below the piston by its previous upward stroke, as the piston descends, the pressure of the fluid below the piston unseats the valve 13ᵃ in the piston, allowing the fluid charge to pass through said valve and to occupy the space above the piston. Upon reaching the end of the downward stroke the valve 13ᵃ of the piston closes, the fluid pressure having been released, and the upward stroke is begun. The fluid is compressed for a part of the upward or compression stroke until the point is reached where the pressure of the fluid overcomes the resistance of the spring in the automatically operated valve 12ᵃ located in the cylinder head—see Fig. 1—and the fluid is discharged from the cylinder during the remainder of the stroke. Simultaneously with the compression and discharge of the fluid above the piston a fresh charge is being drawn into the cylinder below the piston. When the piston has reached the end of the upward stroke, one cycle of events has been completed and the piston is in position to repeat the operations above described. It is thus evident that the upward or compression stroke may at once be identified as the power or working stroke, while the downward or return stroke is practically an idle stroke so far as the amount of work to be done is concerned, and such return stroke will, for convenience, be hereafter so denominated.

Referring now particularly to Figs. 1 to 4, which show the relative positions of the several crank and link members of the invention, at different points of the cycle, and are designed to show the special adaptability of the mechanical movement to a single acting pump or compressor: Noting first the position of the links and cranks in Fig. 1, in which position the piston is about to commence its downward or idle stroke, the connecting rod 20, the link 27, and the crank 29 are in a vertical line, or in alinement with each other and with the direction of movement of the piston, said crank 29 being in one of its dead center positions. The crank 24, however, is at an angle, and preferably at right angles to the center line of the other members 20, 27 and 29, and—rotating in the direction indicated by the arrow in Fig. 1—is in a position of maximum efficiency or effective turning moment, and thus transmits sufficient power through the link 22 upon the pin 21 to carry the crank 29 over its dead center position and start its motion upward. When the lower crank 29 has passed its dead center position, it rapidly gains its position of maximum efficiency or effective turning moment by reason of its almost vertical downward action upon the pin 21, through the link 27. Simultaneously the crank 24 loses its effective turning moment in like degree owing to the angularity of the link 22 relative to the connecting rod 20, but the link 22, however, assumes the function of a toggle arm, forcing the pin 21 to travel in the arc of a circle in its downward movement, thus obtaining practically the effect of shortening the piston rod or in fact shortening the distance between the piston and the point of connection with the shaft 30 or between the piston and the crank pin 28 and shaft 30 during the return, downward, or comparatively idle stroke, and increasing the speed of movement of the piston with relation to the speed of rotation of the shaft 30 and its crank 29 and crank pin 28, accordingly or in proportion to the shortening of the distance between the piston and the crank pin 28, or shaft 30. The combined action of the two links upon the pin 21 during the comparatively idle, return or downward movement of the piston increases the angularity of the connecting rod 20 relative to the path of motion of the crosshead 18, to such an extent that when the links and cranks have reached the positions shown in Fig. 2, the piston has nearly completed its downward stroke, and that when said links and cranks have reached the position shown in Fig. 3, said piston has completed its downward stroke and is about to begin its upward stroke. By examining Figs. 1 to 3, it will be noticed that during the return downward stroke of the piston, the cranks have only traveled through an approximate angle of 135° or about three-eighths of a complete revolution of the crank.

In Fig. 3, assuming that the piston is starting upon its upward or power stroke, the following conditions are found: The lower crank 29 is in the position where it approaches or begins its minimum effective turning moment, or the position where said crank moves in a direction most nearly at right angles to the direction of movement of the piston, which is also the position where the piston moves least in proportion to the distance traversed by the crank during the same interval, or during the movement of the crank past its lower dead center. At the same time the upper crank 24 is in a position of maximum effective turning moment, or in the position where its immediate further movement will be most nearly in the same direction as that of the piston. Its further movement to or toward the position shown in Fig. 4 will occur during the movement of the lower crank 29 past one of its dead centered positions and will carry said lower crank 29 over its vertical or lowermost dead center position. As the lower crank 29 starts its upward rotative movement it rapidly attains its position of maximum efficiency or effective turning moment, or the position where it will move most nearly in the same direction with the piston, thereby exerting an upward force. The link 27 and the connecting rod 20 approach the same straight line during and immediately subsequent to the movement of the crank 29 past or over its lowermost dead centered position. Said link 27 and connecting rod 20 are therefore more nearly in alinement with each other and with the piston rod 14 at the beginning of that most effective portion of the upward movement of the crank 29, which is most nearly in the same direction with the movement of the piston, than they are during the greater part of the downward stroke. During the upward movement of the crank 29 the upper crank 24 moves more nearly at right angles to the direction of movement of the piston, but exerts power through the link 22. The combined action of the two links 22 and 27 upon the pin 21 results in the movement of the pin in a path slightly at an angle to but corresponding substantially with the direction of movement of the piston rod and piston. Fig. 4 shows the position of the cranks and links when the piston is approaching the middle of its upward compression or power stroke, and with the link 27 and connecting rod 20 nearly in alinement and the crank 29 in position to continue through the most effective part of its upward movement or in a direction most nearly identical with that of the piston. It will thus be seen that the distance from the piston to the point of connection with the crank 29 is materially reduced during the downward stroke of the piston by the combined action of the parts as above described, thus producing an effect similar to or substantially identical with that of shortening the piston rod during the downward or return stroke. The distance between the piston and the point of connection with the crank 29 is substantially restored by bringing the links almost into alinement, or in effect restoring the piston rod members 20 and 27, which may be said to form pivotally connected members of a jointed piston rod, to nearly normal position or to such a position that they are substantially in alinement with each other and with the rod member 14 before that position of the parts is reached, which is shown in Fig. 4, or before the beginning of the most effective part of the upward or power stroke is reached. This enables the upward stroke to be continued and completed without further materially increasing the distance between the piston and the point of connection with said crank 29, or, in other words, without in effect materially lengthening the connecting rod during the principal part of the upward stroke. The downward movement of the piston is therefore faster than the upward or power movement or stroke although the speed of rotation of the cranks 24 and 29 and their shafts and of the shaft 33 is or may be uniform or the same throughout both the upward and downward or return stroke of the piston. During the remainder of the compression stroke, after the parts have reached the position shown in Fig. 4, the lower crank 29 is exerting full power upon the connecting rod and continues to do so until it reaches substantially the original position shown in Fig. 1, at which point the piston has completed the compression or power stroke, and the cranks have passed through one complete revolution. Thus the compression stroke of the piston occupies the part of a complete revolution of the cranks, equal to the difference between, approximately three-eighths, necessary for the downward stroke and a complete revolution, or approximately five-eighths of a revolution. The advantages of this arrangement of the division of power during a complete cycle may now be pointed out.

As was before stated, the downward stroke is practically an idle stroke, hence comparatively little power is required to accomplish the work to be done. It is advantageous from the point of economy and performance of an air compressor, to complete an idle stroke in as short a time as possible, thus lessening the amount of energy and time expended during said idle stroke. During the power stroke, in which the actual work is done, the power is applied during approximately five-eighths of a revolution of the cranks. The time occupied in completing the power stroke is greater, nevertheless, and the power is exerted for a greater length of time than that occupied in completing the downward stroke, thus utilizing the greatest amount of power during that portion of the cycle where its application is most effective and essential. In other words, it is evident that one-quarter (the difference between three-eighths and five-eighths) of the total power transmitted to the air compressor has been transferred from the idle stroke to the power stroke, an advantage which can be readily appreciated when the present construction is compared with that of ordinary reciprocating types of air compressors, in which the effective power exerted during the compression stroke occupies only one-half of the revolution of the cranks.

When my invention is applied to an internal combustion engine the piston is the driving member, while in the case of the compressor, above described, the piston is the driven member. In an internal combustion engine of the single acting four cycle type, it requires four strokes of the piston to complete a cycle of events, or, in other words, to transmit a single power impulse to the driving shaft. One complete cycle comprises the following strokes: (a), the admission stroke in which a charge of combustion gas is drawn into the combustion chamber through the inlet valve by the forward travel of the piston; (b), the compression stroke in which the mixture gases confined in the combustion chamber are compressed during the return backward stroke of the piston; (c), expansion stroke or power stroke which follows immediately the ignition of the gas and forces the piston forward due to the instantaneous expansion of the ignited gases and, (d), the exhaust stroke whereby the burned gases are discharged from the cylinder through the exhaust valve, preparatory to receiving a fresh charge on the succeeding forward stroke. With crank and link members of my invention applied in connection with an internal combustion engine of the type referred to, the power is applied at the connecting rod in the form of reciprocatory movement and is transformed into a rotary motion of the main shaft.

As stated above, only one stroke in every four is a power stroke and the remaining three are non-power strokes, consequently the fly-wheel with which the internal combustion engine is applied must store up sufficient energy during the single power stroke to carry the piston through the three succeeding idle strokes as well as to deliver continuous power to the particular mechanism of which it is the prime mover. Clearly the longer the power is applied upon the cranks the greater will be the amount of energy transmitted to the fly-wheel. This is the principal advantage of this particular mechanical movement, namely, that the piston being driven forward by the explosive effect of the ignited gases transmits power through the fly-wheel, through the links and crank members, not during merely one-half of a revolution, as is the case in the ordinary gas engine, but during approximately five-eighths of the revolution of the fly-wheel. Hence more power will be delivered at the fly wheel during a given period of time with the same amount of power exerted upon the piston than in the case of engines of known construction having a piston which moves at the same speed with relation to the rotation of the crank mechanism connected therewith during both the power and return strokes. Obviously two advantages are gained, first greater efficiency and economy by a reduction in the amount of fuel required to obtain or deliver a given amount of work or power, and secondly, reduction in weight of the parts including the fly-wheel and the parts necessary to support the same.

A mechanical movement embracing the features of construction set forth may be used also with advantage in cases in which the saving of power or energy is not a material factor, as when it is desired to give movement to a reciprocating part more rapidly or quickly in one direction than in the other, as—for instance—in the case of a reciprocating bed of a printing press.

A mechanism embodying the essential features of my invention may be variously constructed in practice so far as its mechanical features and details are concerned, and I do not desire that my invention be limited to the features illustrated and hereinbefore described, except as pointed out in the claims.

I claim:

1. A mechanical movement comprising a reciprocating member, two cranks rotative about separate and parallel axes, one of which axes is located in alinement with the path of movement of the reciprocating member and the other laterally offset from said path, a driving connection between said cranks effecting rotative motion thereof in the same direction, two links, each of which is engaged at one end with one of said cranks and is pivotally united at its opposite end with the corresponding end of the other link, and means affording driving connection between said reciprocating member and the pivotally united ends of said links, the said cranks being disposed in such relation to each other that in two points of their annular paths each crank pin will have movement in a direction generally at right angles to the direction of movement of the other crank pin.

2. A mechanical movement comprising a reciprocating member, two cranks, a driving connection between said cranks effecting rotation thereof in the same direction, two links, each of which is engaged at one end with one of said cranks and is pivotally united at its opposite end with the corresponding end of the other link, and a pitman pivotally connected with the reciprocating member and with the pivotally united ends of said links.

3. A mechanical movement comprising a reciprocating member, two rotary cranks turning about separate axes, one of which is located in line with the path of motion of the reciprocating member and the other laterally offset from said path, two links each pivotally connected with a crank, a connecting rod operatively connected with the opposite ends of said links and with the reciprocating member, two shafts upon which said cranks are mounted, a toothed gear wheel upon each of said shafts, and an intermediate gear wheel rotatably mounted between and in toothed engagement with both of said gear wheels.

4. A mechanical movement comprising a reciprocating member, two rotary cranks turning about separate axes, one of which is located in line with the path of motion of the reciprocating member and the other laterally offset from said path, two links each pivotally connected with a crank, a connecting rod operatively connected with the opposite ends of said links and with the reciprocating member, two shafts upon which said cranks are mounted, a toothed gear wheel upon each of said shafts, an intermediate gear wheel located between and in toothed engagement with both of said gear wheels, and a rotary shaft upon and in fixed relation to which said intermediate gear wheel is mounted.

5. A mechanical movement comprising a reciprocating member, two rotative cranks, one of which is located at a greater distance from the reciprocating member than the other, means affording driving connection between said cranks affording rotative movement thereof in the same direction, two links each having one end pivotally connected with one of said cranks, and a pitman pivotally connected with said reciprocating member and with both of said links, said pitman and the link connected with the crank which is at the greater distance from the reciprocating member constituting a toggle by which the reciprocating member is given motion through a distance greater than the throw of said last named crank.

6. A mechanical movement comprising a reciprocating member, two rotary cranks turning about separate axes, one of which is located in alinement with the path of motion of the reciprocating member and the other of which is offset from said path, two links, each pivotally connected with one of said cranks, a connecting rod pivotally connected with the opposite ends of said links and with the reciprocating member, two shafts upon which said cranks are mounted, a toothed gear wheel upon each of said shafts, an intermediate gear wheel located between and in toothed engagement with both of said gear wheels, and a rotary shaft upon and in fixed relation to which said intermediate gear wheel is mounted.

7. A mechanical movement comprising a reciprocating member, two rotary cranks turning about separate axles, one of which is located in alinement with the path of motion of the reciprocating member and the other of which is offset from said path, two links, each pivotally connected with one of said cranks, a connecting rod pivotally connected with the opposite ends of said links and with the reciprocating member, two shafts upon which said cranks are mounted, a toothed gear wheel upon each of said shafts, an intermediate gear wheel located between and in toothed engagement with both of said gear wheels, a rotary shaft upon and in fixed relation to which said intermediate gear wheel is mounted, and a fly wheel upon said intermediate shaft.

8. A mechanical movement comprising a reciprocating member, two cranks rotative about separate axes and located at unequal distances from said reciprocating member, the axis of the crank nearest the reciprocating member being offset laterally from the path of motion of said member, means affording driving connection between said cranks effecting rotation thereof at uniform speed and in the same direction, a pitman pivotally connected with said reciprocating member, a link engaging at one end the crank which is at the greatest distance from said reciprocating member and pivotally connected at its opposite end with the adjacent end of said pitman, and a second link extending laterally with respect to the pitman and the first named link, said second link engaging at one end the crank nearest the reciprocating member and being pivotally connected at its opposite end with the pivotally joined ends of said pitman and the first mentioned link, said pitman and the first mentioned link constituting a toggle by which the reciprocating member is given motion through a distance greater than the throw of said crank which is at the greater distance from said reciprocating member.

9. A mechanical movement comprising a reciprocating member, two rotative cranks turning on separate axes, said cranks being located at unequal distances from the reciprocating member, and the crank which is at the greater distance from the reciprocating member having its axis in alinement with the path of movement of the reciprocating member, a driving connection between said cranks acting to effect rotation thereof in the same direction, a pitman pivotally connected with said reciprocating member, two links each of which is connected at one end with one of said cranks, and is pivotally connected at its opposite end with the corresponding end of the other link and with the pitman, the link connected with the crank remote from the reciprocating member constituting with the pitman, a toggle, and the crank nearest the reciprocating member with its associated link constituting a means for flexing and straightening the toggle.

10. A mechanical movement comprising a reciprocating member, two rotative cranks turning on separate axes in the same direction, said cranks being located at unequal distances from the reciprocating member, and the crank which is at the greater distance from the reciprocating member having its axis in alinement with the path of movement of the reciprocating member, and the crank nearest the reciprocating member having its axis laterally offset from said path, a driving connection between said cranks, a pitman pivotally connected with said reciprocating member, two links each of which is connected at one end with one of said cranks and is pivotally connected at its opposite end with the corresponding end of the other link and with the pitman, the said cranks being arranged in angular relation to each other and in such relative positions that the crank remote from the reciprocating member will turn through a smaller angular distance and afford movement of the reciprocating member at a greater speed, in the stroke of the reciprocating member in one direction than in the other.

In testimony, that I claim the foregoing as my invention I affix my signature in the presence of two witnesses, this 16th day of May A. D. 1912.

JOHN C. KITTON.

Witnesses:
CHARLES M. POOLE,
EUGENE C. WANN.